Patented Sept. 8, 1942

2,294,924

UNITED STATES PATENT OFFICE 2,294,924

TREATMENT OF CELLULOSE WITH ALKALI METAL AMIDES IN ANHYDROUS LIQUID AMMONIA

Clemmy O. Miller, Milwaukee, Wis., and Arthur E. Siehrs, Chicago, Ill., assignors to North American Rayon Corporation, New York, N. Y., a corporation of Delaware No Drawing. Original application November 30, 1937, Serial No. 177,389. Divided and this application March 29, 1939, Serial No. 264,857

40 Claims. (Cl. 260—209)

A primary object of the invention is to provide an improved procedure for producing reactive forms of cellulose from which cellulose esters and cellulose ethers can be obtained. The general methods to be presently described for manufacturing the reactive forms of cellulose are applicable to carbohydrates of similar constitution, such as starch and other polysaccharides, and the invention comprises the treatment of these substances when the application of the improved process is found to be advantageous. It is, therefore, to be understood that where the terms cellulose or cellulosic materials are used, it is intended to cover the treatment of such carbohydrates whenever found advantageous. It is also intended to include cotton, cotton linters, wood pulp, and other forms of cellulose, including regenerated cellulose and derivatives of cellulose such as mono- or di-substituted alkali metal cellulosates.

In carrying out the invention of the present application, the cellulosic material is reacted in the presence of liquid ammonia with an alkali metal amide.

As a specific example of our improved process utilizing alkali metal amides, 3 parts of dried cellulose may be suspended in 10 parts of liquid anhydrous ammonia and one part of potassium amide may be added. This may be allowed to stand for an hour, after which the alkali metal cellulosate resulting from the reaction may be separated from the adhering liquid by pressing, allowing time for evaporation, exposure to reduce pressure, or slight warming. It is then ready for conversion into other cellulosic products. The alkali metal cellulosate resulting from this process may be reacted with carbon bisulfide to produce xanthates or with etherifying or esterifying agents.

In order to produce tri-substituted potassium cellulosate, larger quantities of potassium amide in proportion to the cellulose should be used; for example, they should be reacted in about the proportion of one to one.

In place of the potassium amide, sodium amide or other alkali metal amide, such as the amides of lithium, caesium or rubidium may be used.

Moisture is an important factor and must be excluded from the materials used and from the containing vessel. The container must be constructed to prevent the entrance of air carrying moisture. Even though a reactive product may be obtained using cellulose that has been incompletely dried or using ammonia containing moisture, it is not economical to carry out the reaction in the presence of substantial quantities of water. The success of the reaction is not dependent upon any particular temperatures and pressures, and therefore the choice of temperatures and pressures is made on the basis of convenience. We have found the temperatures of boiling ammonia at atmospheric pressure (about —33° C.) generally to be the most convenient although we may work at temperatures above and below —33° C. When we use sodamide, we have found it more convenient to carry out the process at 25° C. and at the pressure of anhydrous ammonia at that temperature. The ratio of the amounts of potassium amide to cellulose used may vary considerably and still give a reactive material. We have not found it advantageous to increase the amount of potassium amide beyond the point where the ratio of the amount of potassium amide to cellulose is greater than one. The amount of liquid ammonia used depends upon the solubility of the particular amide used; potassium amide being more soluble than sodium amide would require less liquid ammonia to carry out the reaction.

The alkali metal amides may be prepared by dissolving or dispersing an alkali metal in liquid ammonia in the presence of a catalyst, such as iron, platinum black, etc.

The above reactions may, if desired, be carried out in the presence of an inert solvent, which does not react with the liquid ammonia or with the reacting ingredients or products. Examples of such inert solvents are benzene, acetone, alcohol, ethers, ketones or other hydrocarbons, esters, etc., which are inert in the reaction mixture.

The cellulosates resulting from the above reactions may be reacted with carbon bisulfide to produce xanthates or with esterifying agents, such as acid anhydrides or acyl halides, or etherifying agents, such as alkyl or aryl halides to form esters and ethers.

In this application the term "liquid anhydrous ammonia" is intended to comprise the liquefied gas having for formula $NH_3$, which, however, may contain such amounts of water as are unavoidable in the preparation and liquefaction thereof when operated on a commercial scale.

This application is a division of our application Serial No. 177,389, filed November 30, 1937, entitled "Manufacture of reactive forms of cellulose and the like," which is a continuation in part of our application Serial No. 589,974, filed January 30, 1932.

We claim:

1. The process which comprises reacting a carbohydrate with an alkali metal amide in a medium of anhydrous liquid ammonia.

2. The process which comprises reacting a cellulosic material with an alkali metal amide in a medium of anhydrous liquid ammonia.

3. The process which comprises reacting cellulose with an alkali metal amide in a medium of anhydrous liquid ammonia.

4. The process which comprises reacting cellulose with sodium amide in a medium of liquid ammonia.

5. The process which comprises reacting substantially anhydrous cellulose with an alkali metal amide in a medium of anhydrous liquid ammonia, said amide being present in said ammonia in a sufficient amount to react with all of the hydroxyl groups of said cellulose.

6. The process which comprises reacting substantially anhydrous cellulose with an alkali metal amide in a medium of anhydrous liquid ammonia, said amide being present in said ammonia in a sufficient amount to react with at least one of the hydroxyl groups of said cellulose.

7. The process which comprises reacting substantially anhydrous cellulose with an alkali metal amide in a medium of anhydrous liquid ammonia, said amide being present in said ammonia in a sufficient amount to react with at least two of the hydroxyl groups of said cellulose.

8. The process which comprises reacting substantially anhydrous cellulose with an alkali metal amide in a medium of anhydrous liquid ammonia at a temperature of about $-33°$ C.

9. The process which comprises reacting substantially anhydrous cellulose with an alkali metal amide in a medium of anhydrous liquid ammonia at a temperature below $-33°$ C.

10. The process which comprises reacting substantially anhydrous cellulose with an alkali metal amide in a medium of anhydrous liquid ammonia at a temperature not exceeding about $+25°$ C. and under the vapor pressure of liquid ammonia at the temperature employed.

11. The process which comprises reacting substantially anhydrous cellulose with sodium amide in a medium of anhydrous liquid ammonia at a temperature of about $-33°$ C.

12. The process which comprises reacting substantially anhydrous cellulose with sodium amide in a medium of anhydrous liquid ammonia at a temperature below $-33°$ C.

13. The process which comprises reacting substantially anhydrous cellulose with sodium amide in a medium of anhydrous liquid ammonia at a temperature up to about $+25°$ C. and under the vapor pressure of liquid at the temperature employed.

14. The process of producing a carbohydrate derivative which comprises treating a carbohydrate with an alkali metal amide in a medium comprising anhydrous liquid ammonia and reacting the resulting product with an agent capable of replacing alkali metal in the said resulting product to form a derivative of said carbohydrate.

15. The process of producing a cellulose derivative which comprises treating a cellulosic material with an alkali metal amide in a medium comprising anhydrous liquid ammonia and reacting the resulting product with an agent capable of replacing alkali metal in the said resulting product to form a derivative of said cellulosic material.

16. The process which comprises reacting a substantially anhydrous cellulose with an alkali metal amide in a medium comprising anhydrous liquid ammonia to form an alkali metal cellulosate and subsequently reacting said cellulosate with a halide etherifying agent to form a cellulose ether.

17. The process which comprises reacting a substantially anhydrous cellulose with an alkali metal amide at a temperature of about $-33°$ C. in a medium comprising anhydrous liquid ammonia to form an alkali metal cellulosate and subsequently reacting said cellulosate with a halide etherifying agent to form a cellulose ether.

18. The process which comprises reacting a substantially anhydrous cellulose with an alkali metal amide at a temperature below $-33°$ C. in a medium comprising anhydrous liquid ammonia to form an alkali metal cellulosate and subsequently reacting said cellulosate with a halide etherifying agent to form a cellulose ether.

19. The process which comprises reacting a substantially anhydrous cellulose with an alkali metal amide at a temperature above $-33°$ C. in a medium comprising anhydrous liquid ammonia to form an alkali metal cellulosate and subsequently reacting said cellulosate with a halide etherifying agent to form a cellulose ether.

20. The process which comprises reacting a substantially anhydrous cellulose with an alkali metal amide in a medium comprising anhydrous liquid ammonia at a temperature of about $25°$ C. to form an alkali metal cellulosate and subsequently reacting said cellulosate with halide etherifying agent to form a cellulose ether.

21. The process which comprises reacting substantially anhydrous cellulose with sodium amide in a medium comprising anhydrous liquid ammonia to form a sodium cellulosate and subsequently reacting said cellulosate with a halide etherifying agent to form a cellulose ether.

22. The process which comprises reacting substantially anhydrous cellulose with sodium amide at a temperature of about $-33°$ C. in a medium comprising anhydrous liquid ammonia to form a sodium cellulosate and subsequently reacting said cellulosate with a halide etherifying agent to form a cellulose ether.

23. The process which comprises reacting substantially anhydrous cellulose with sodium amide at a temperature below $-33°$ C. in a medium comprising anhydrous liquid ammonia to form a sodium cellulosate and subsequently reacting said cellulosate with a halide etherifying agent to form a cellulose ether.

24. The process which comprises reacting substantially anhydrous cellulose with sodium amide at a temperature above $-33°$ C. in a medium comprising anhydrous liquid ammonia to form a sodium cellulosate and subsequently reacting said cellulosate with a halide etherifying agent to form a cellulose ether.

25. The process which comprises reacting substantially anhydrous cellulose with sodium amide at a temperature of about $+25°$ C. in a medium comprising anhydrous liquid ammonia to form a sodium cellulosate and subsequently reacting said cellulosate with a halide etherifying agent to form a cellulose ether.

26. The process which comprises reacting substantially anhydrous cellulose with an alkali metal amide in a medium comprising anhydrous liquid ammonia to form an alkali metal cellulosate and subsequently reacting said cellulosate with an alkyl halide to form a cellulose ether.

27. The process which comprises reacting substantially anhydrous cellulose with an alkali metal amide in a medium comprising anhydrous liquid ammonia to form an alkali metal cellulosate and subsequently reacting said cellulosate with an aryl halide to form a cellulose ether.

28. The process which comprises reacting substantially anhydrous cellulose with an alkali metal amide in a medium comprising anhydrous liquid ammonia to form an alkali metal cellulosate and subsequently reacting said cellulosate with a halide etherifying agent to form a cellulose ether, said reactions being carried out with a liquid inert in the reaction mixture.

29. The process which comprises reacting substantially anhydrous cellulose with an alkali metal amide in a medium comprising anhydrous liquid ammonia to form an alkali metal cellulosate and subsequently reacting said cellulosate with a halide etherifying agent to form a cellulose ether, said reactions being carried out with a hydrocarbon inert in the reaction mixture.

30. The process which comprises reacting substantially anhydrous cellulose with an alkali metal amide in a medium comprising anhydrous liquid ammonia to form an alkali metal cellulosate and subsequently reacting said cellulosate with halide etherifying agent to form a cellulose ether, said reactions being carried out with an aromatic hydrocarbon inert in the reaction mixture.

31. The process which comprises reacting substantly anhydrous cellulose with an alkali metal amide in a medium comprising anhydrous liquid ammonia to form an alkali metal cellulosate, removing excess ammonia from said cellulosate and then reacting said cellulosate with a halide etherifying agent to form a cellulose ether.

32. The process which comprises reacting one part by weight of substantially anhydrous cellulose with up to one part by weight of an alkali metal amide in a medium comprising anhydrous liquid ammonia to form an alkali metal cellulosate.

33. The process which comprises reacting one part by weight of substantially anhydrous cellulose with up to 1 part by weight of an alkali metal amide in a medium comprising anhydrous liquid ammonia to form an alkali metal cellulosate and subsequently reacting said cellulosate with a halide etherifying agent to form a cellulose ether.

34. The process which comprises reacting one part by weight of substantially anhydrous cellulose with up to 1 part by weight of an alkali metal amide at a temperature below $-33°$ C. in a medium comprising anhydrous liquid ammonia and subsequently reacting said cellulosate with a halide etherifying agent to form a cellulose ether.

35. The process which comprises reacting substantially anhydrous cellulose with sodium amide in a medium of anhydrous liquid ammonia.

36. The process which comprises reacting substantially anhydrous cellulose with an alkali metal amide in a medium of anhydrous liquid ammonia at a temperature below about 25° C. and under the vapor pressure of liquid ammonia corresponding to the temperature employed.

37. The process which comprises reacting substantially anhydrous cellulose with sodium amide in a medium of anhydrous liquid ammonia at atmospheric pressure and at a temperature below about $-33°$ C.

38. The process of producing a cellulose derivative which comprises treating cellulose with an alkali metal amide in a medium comprising anhydrous liquid ammonia and reacting the resulting product with an agent capable of replacing alkali metal in the said resulting product to form a cellulose derivative.

39. The process of producing a carbohydrate derivative which comprises treating a carbohydrate with an alkali metal amide in a medium comprising anhydrous liquid ammonia and reacting the resulting product with an agent capable of replacing alkali metal in the said resulting product to form a carbohydrate derivative, said reactions being carried out with benzene in the reaction mixture.

40. The process of producing a carbohydrate derivative which comprises treating a carbohydrate with an alkali metal amide in a medium comprising anhydrous liquid ammonia and reacting the resulting product with a halide etherifying agent to form a cellulose ether, said reactions being carried out with benzene in the reaction mixture.

CLEMMY O. MILLER.
ARTHUR E. SIEHRS.